O. A. SMITH.
PRIMING CUP.
APPLICATION FILED APR. 22, 1914.

1,153,457.

Patented Sept. 14, 1915.

Witnesses:

Oscar A. Smith
Inventor
By his Attorney

UNITED STATES PATENT OFFICE.

OSCAR A. SMITH, OF CLEVELAND, OHIO.

PRIMING-CUP.

1,153,457.  Specification of Letters Patent.  Patented Sept. 14, 1915.

Application filed April 22, 1914. Serial No. 833,590.

*To all whom it may concern:*

Be it known that I, OSCAR A. SMITH, a citizen of the United States, residing at Cleveland, in the county of Cuyahoga and State of Ohio, have invented certain new and useful Improvements in Priming-Cups, of which the following is a specification.

This invention relates to priming cups for gas engines, the object of the invention being to provide an improved cup which can be quickly, readily and inexpensively made in two parts, each of which can be practically made complete on an automatic screw machine and which parts are so constructed and assembled that when the cup is closed there is no opening thereinto from the engine, so that it is not possible for carbon and soot to enter the cup.

In the ordinary priming cups there is usually a hole or opening below the valve so that carbon and soot frequently close up this hole while the carbon also affects the valve, causing it to set and render it hard to turn, and under these conditions grooves become cut by the carbon in the valve and there is sometimes a loss of power through the priming cup.

The gist of the present improvement therefore is the provision of an improved priming cup readily and inexpensively made of two parts, and in which there is no possibility of soot and carbon entering the cup from the engine when the valve is closed.

Figure 1:
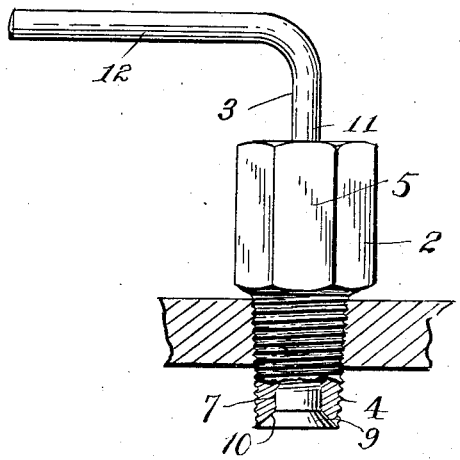
Figure 2:
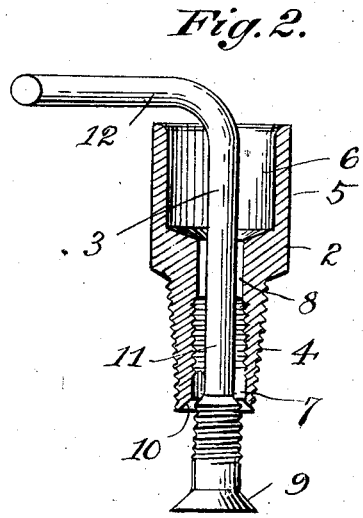
Figure 3:
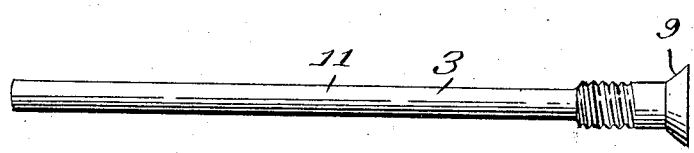
Figure 4:
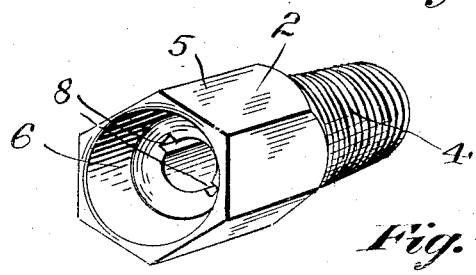

In the drawings accompanying and forming part of this specification, Figure 1 is a side view of this improved cup with the valve closed; Fig. 2 is a vertical sectional view thereof with the valve open; Fig. 3 is a view of the valve member; and Fig. 4 is a perspective view of the cup member.

Similar characters of reference indicate corresponding parts throughout the several figures of the drawings.

The present improved priming cup, while particularly constructed for use with gas engines, is adapted for various purposes and comprises a one-piece cup or body member 2 and a one-piece valve member 3. The cup or body member 2 is preferably made from a single piece of brass exteriorly threaded at one end as at 4 for insertion into the engine and angularly formed at the opposite end as at 5 for the reception of a wrench. This body member is drilled to form an axial passage and is also threaded interiorly at the end as at 6, and its opposite end is counterbored as at 7 to provide a chamber or cup for the reception of the gasolene. Communicating with this chamber are two small broached holes or passages 8 for the passage of the gasolene from the chamber on the opening of the valve.

The valve comprises a headed and tapered end 9 adapted to tightly fit against the tapered seat 10 of the body member. The stem 11 of this valve is threaded at its lower end for engagement with the interior threads of the body member, and this stem extends through the body and when assembled is provided with a bent end 12 to form a handle, and this bent handle also prevents the valve from dropping away from the body when the parts are assembled. In the use of the device gasolene is poured into the counterbored opening forming the cup, and when the valve is open it runs through the broached passages into the cylinder to which the body member is attached.

Thus it will be seen that when the valve is closed the opening into the body member at the bottom end of the device is entirely closed by the tapered valve member, so that there is no opportunity for the passage of carbon or soot to the cup or to interfere with the effective closing of the valve or in any way interfere with the operation of the device, and consequently there is no chance for the valve passage in the body to become clogged, while at the same time the device can be inexpensively and cheaply made of two parts each upon an automatic multiple-spindle screw machine. Moreover, there is no liability of one part dropping from the other into the engine, while the priming of the engine by means of this cup is a direct priming, that is to say, the liquid runs directly down from the cup into the engine.

I claim as my invention:

1. A priming cup for gas engines comprising a two-part device, each part of an integral structure, one part consisting of a body member having an axial passage therethrough and terminating at one end in a tapered valve seat and at its opposite end in a cylindrical fluid receiving chamber, said passage having its wall provided with threads and one or more laterally extending recesses, and said body having at one end external threads and at its opposite end a wrench receiving portion, and the other integral part consisting of a stem extending through said passage and having a tapered valve for engaging said seat and provided with threads coöperating with said first threads, the opening of the valve being obtained by lowering said valve from the seat in the direction of flow of fluid from said chamber when in normal position and the closing thereof by drawing the valve in the opposite direction.

2. A priming cup for gas engines comprising a body member having an axial passage therethrough and provided at one end with internal and external threads and at its opposite end with a fluid-receiving chamber having thereon a wrench-receiving portion, said body member terminating at its threaded end in a tapered valve seat, and a stem extending through said passage and provided with threads adapted to coöperate with the internal threads of said body and also provided with a valve for engaging said seat, the organization being such that the valve is opened by moving said valve from its seat in the direction of flow of fluid from said fluid-receiving chamber when in normal position.

3. A priming cup for gas engines comprising a body member having an axial passage therethrough and provided with internal and external threads at one end thereof and a fluid-receiving chamber having a wrench-receiving portion formed on its outer surface at the opposite end thereof, said body member terminating at its threaded end in a tapered valve seat, and a stem extending through said passage and provided with threads coöperating with the internal threads of said body and terminating in a valve for engaging said valve seat, the organization being such that the valve is opened by moving said valve from its seat in the direction of flow of fluid from said fluid-receiving chamber when in normal position.

4. A priming cup for gas engines comprising a two-part device, one part consisting of a body member having an axial passage therethrough and terminating at one end in a valve seat, and at its opposite end in a fluid receiving chamber, such body having at one end external threads and at its opposite end a wrench receiving portion, and the other part consisting of a stem extending through said passage and having a valve for engaging said seat, the opening of the valve being obtained by lowering said valve from the seat in the direction of flow of fluid from said chamber when in normal position and the closing thereof by drawing the valve in the opposite direction.

5. A priming cup for gas engines comprising a two-part device, one part consisting of a body member having an axial passage therethrough and terminating at one end in a valve seat and at its opposite end in a fluid receiving chamber, said passage having its wall provided with threads and said body having at one end external threads and at its opposite end a wrench receiving portion, and the other part consisting of a stem extending through said passage and having a valve for engaging said seat and provided with threads coöperating with said first threads, the opening of the valve being obtained by lowering said valve from the seat in the direction of flow of fluid from said chamber when in normal position and the closing thereof by drawing the valve in the opposite direction.

6. A priming cup for gas engines comprising a two-part device, one part consisting of a body member having an axial passage therethrough and terminating at one end in a tapered valve seat and at its opposite end in a fluid receiving chamber of greater diameter than said axial passage, said passage having its wall provided with threads, and said body having at one end external threads and at its opposite end a wrench receiving portion, and the other part consisting of a stem extending through said passage and having a tapered valve for engaging said seat and provided with threads coöperating with said first threads, the opening of the valve being obtained by lowering said valve from the seat in the direction of flow of fluid from said chamber when in normal position and the closing thereof by drawing the valve in the opposite direction.

7. A priming cup for gas engines comprising a two-part device, one part consisting of a body member having an axial passage therethrough and terminating at one end in a tapered valve seat and at its opposite end in a fluid receiving chamber of greater diameter than said axial passage, said passage having its wall provided with threads, and said body having at one end external threads and at its opposite end a wrench receiving portion, and the other part consisting of a stem extending through said passage and having a tapered valve for engaging said seat and provided with threads coöperating with said first threads, said stem having a bent handle-forming portion, the opening of the valve being obtained by lowering said valve from the seat in the direction of flow of fluid from said chamber when in normal position and the closing thereof by drawing the valve in the opposite direction.

8. A priming cup for gas engines comprising a two-part device consisting of a body having an enlarged wrench receiving portion provided with a fluid receiving chamber, and a smaller externally threaded portion having an axial passage communicating with said chamber at one end and terminating at its opposite end in a tapered valve seat, a stem extending through said passage and projecting beyond said valve seat and having a tapered valve coöperating with said seat whereby the opening of the valve is obtained by lowering said valve from the seat in the direction of flow of fluid from said chamber when in normal position and the closing thereof by drawing the valve in the opposite direction, said stem having threads coöperating with threads formed on the wall of said axial passage.

9. A priming cup for gas engines comprising a two-part device consisting of a body having an enlarged wrench receiving portion provided with a fluid receiving chamber, and a smaller externally threaded portion having an axial passage comunicating with said chamber at one end and terminating at its opposite end in a tapered valve seat, a stem extending through said passage and projecting beyond said valve seat and having a tapered valve coöperating with said seat whereby the opening of the valve is obtained by lowering said valve from the seat in the direction of flow of fluid from said chamber when in normal position and the closing thereof by drawing the valve in the opposite direction, said stem having threads coöperating with threads formed on the wall of said axial passage, and said stem having a bent handle-forming portion projecting beyond the chamber of said body member.

10. A priming cup for gas engines comprising a two-part device consisting of a body having an enlarged wrench receiving portion provided with a fluid receiving chamber, and a smaller externally threaded portion having an axial passage communicating with said chamber at one end and terminating at its opposite end in a tapered valve seat, a stem extending through said passage and projecting beyond said valve seat and having a tapered valve coöperating with said seat whereby the opening of the valve is obtained by lowering said valve from the seat in the direction of flow of fluid from said chamber when in normal position and the closing thereof by drawing the valve in the opposite direction, said stem having threads coöperating with threads formed on the wall of said axial passage, and said axial passage having one or more communicating laterally extending recesses opening into said chamber.

OSCAR A. SMITH.

Witnesses:
FRANK SLUKA, Jr.,
PAUL E. RYAN.